United States Patent

[11] 3,535,993

| [72] | Inventor | Harry S. Jones<br>50 Navesink Drive, Monmouth Beach, New Jersey 07750 |
|------|----------|----|
| [21] | Appl. No. | 665,849 |
| [22] | Filed | Sept. 6, 1967 |
| [45] | Patented | Oct. 27, 1970 |

[54] RELIEF DATA CONVERTER
21 Claims, 18 Drawing Figs.

[52] U.S. Cl.......................................... 95/18
[51] Int. Cl............................................. G03b 35/08
[50] Field of Search................................ 95/18

[56] References Cited
UNITED STATES PATENTS

| 2,045,119 | 6/1936 | Carpenter | 95/18(P)UX |
| 2,185,221 | 1/1940 | Nakken | 95/18(P)UX |
| 2,573,242 | 10/1951 | Bonnet | 95/18(P)UX |
| 2,602,385 | 7/1952 | Bonnet | 95/18(P)UX |
| 2,622,472 | 12/1952 | Bonnet | 95/18(P)UX |
| 3,301,154 | 1/1967 | Stewart | 95/18(P)UX |

*Primary Examiner*—John M. Horan
*Attorney*—Burgess, Dinklage & Sprung

ABSTRACT: The three-dimensional image recorded by "-snapshot" exposure upon a single sheet of photo-sensitive film placed under a single array of vertically-oriented cylindrical lenses, using an objective lens of substantial horizontal aperture will be abnormal or pseudoscopic when observed after processing via a similar single array of cylindrical lenses. Several alternate optical means are described for use in the camera in lieu of the usual single cylindrical lens array which will convert the abnormal three-dimensional image to a normal or true stereoscopic image when the processed film is viewed through a simple single array of cylindrical lenses.

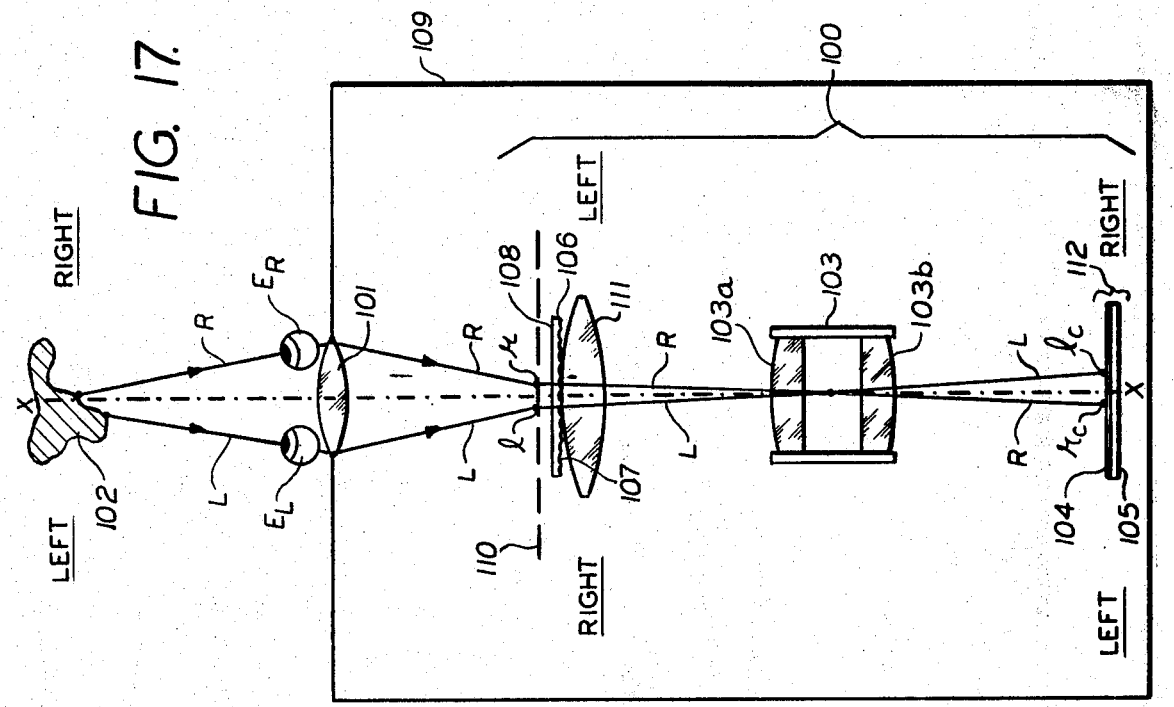
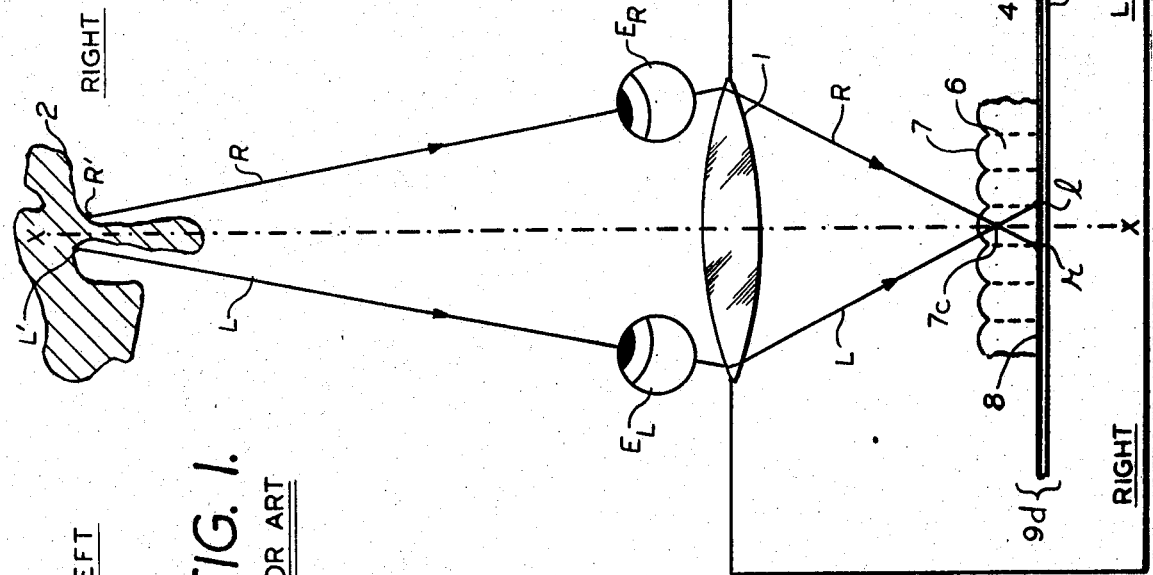

Patented Oct. 27, 1970     3,535,993

INVENTOR
HARRY S. JONES
BY Burgen, Dinklage and Sprung
ATTORNEY.

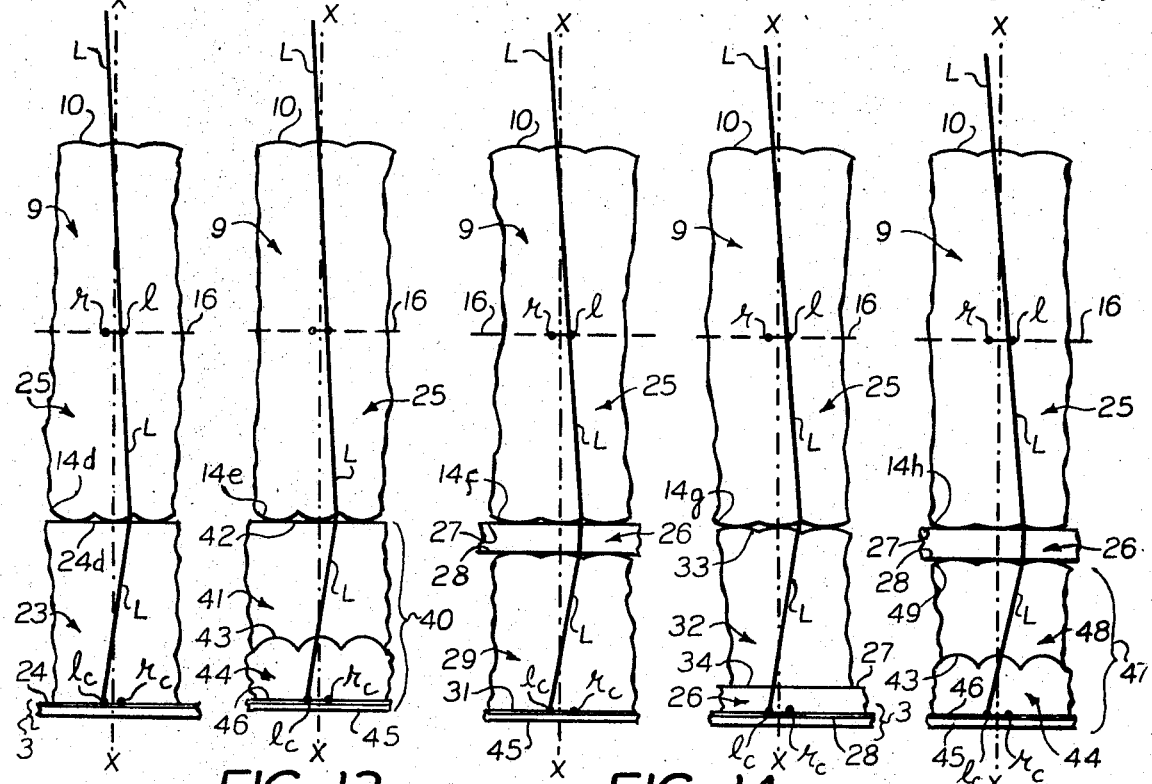
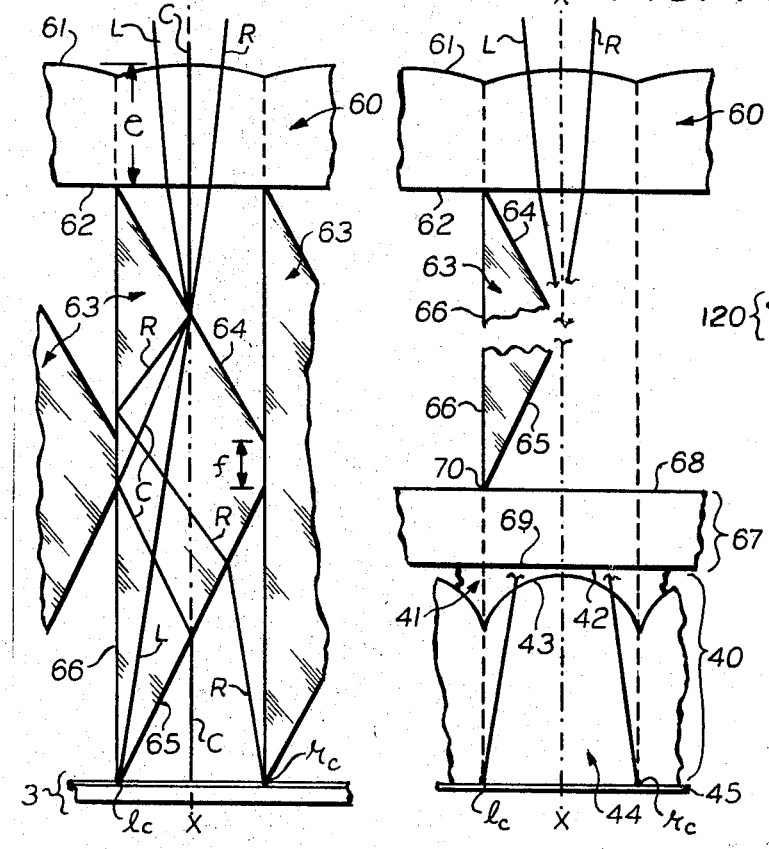
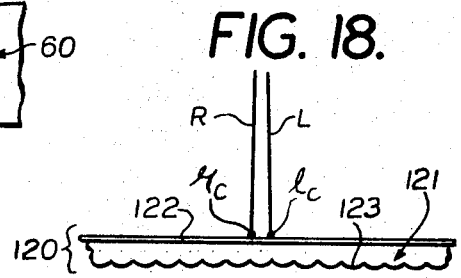

Patented Oct. 27, 1970

INVENTOR
HARRY S. JONES
BY Burgess, Dinklage
and Sprung
ATTORNEY.

RELIEF DATA CONVERTER

The use of a single lens employing a horizontal slit type aperture and a vertically operating curtain type shutter adjacent to the slit aperture to obtain a snapshot picture having three dimensions is described in prior art such as U.S. Pat. No. 1,882,424. To obtain a three-dimensional picture, an array of vertically-oriented grid bars or cylindrical lenses is located between the camera lens and the photosensitive film. However, the type of three-dimensional image obtained using this very simple and desirable type of camera is abnormal when the same type cylindrical lens system is used for viewing the relief picture after processing of the film. For example, in the three-dimensional image of a person holding an object, the person will appear to be moving that object toward the viewer as the viewer moves his head to either side. The object, therefore, seems to follow the viewer as he moves. This is, of course, just opposite to normal experience and opposite to what is desired in a normal three-dimensional photograph.

Despite this phenomenon of the forward object seeming to follow the viewer, observers of such "pseudo three-dimension" seem to mentally compensate and "see" front and rear objects in their proper relation until instructed to critically observe the relation. Thus, this appears to be a psychophysiological characteristic which is not thought to have been previously published.

When it is desired to use a simple snapshot camera of the above-described type to obtain a normal relief photograph, two basic approaches are available. One approach is to convert the relief from abnormal to normal in the camera during photographic exposure, as revealed in U.S. Pat. No. 3,301,154, and and in copending application, Ser. No. 649,308, filed June 27, 1967, and also as described herein. Another approach is to perform this conversion after the three-dimensional photograph is exposed and processed, as described in copending applications, Ser. Nos. 649,312, 649,306 and 649,311, filed June 27, 1967.

Analysis of abnormal and normal relief photographs has revealed that an abnormal photograph may be converted to a normal relief photograph only by reversing the order of the relief data recorded under each cylindrical lens element of the lens array adjacent to the film. No type of reversal of the overall format by any conventional means will accomplish this. Only individual processing of these individual data groups relative to the overall format will produce the type of inversion desired.

It is therefore an object of this invention to provide novel means for in-camera reversal of each individual data strip under each lenticulation without reversing the format of the entire picture.

Other and additional objects of this invention will become apparent from a consideration of this entire specification, including the drawing and claims hereof.

In accord with and fulfilling these objects, one aspect of this invention resides in various means, as hereinafter more fully described, for accomplishing data strip reversal without reversing the overall picture format.

Understanding of this invention will be facilitated by reference to the accompanying drawing in which:

FIG. 1 is a schematic view of a three-dimensional camera arrangement as known in the prior art;

Figure 2:
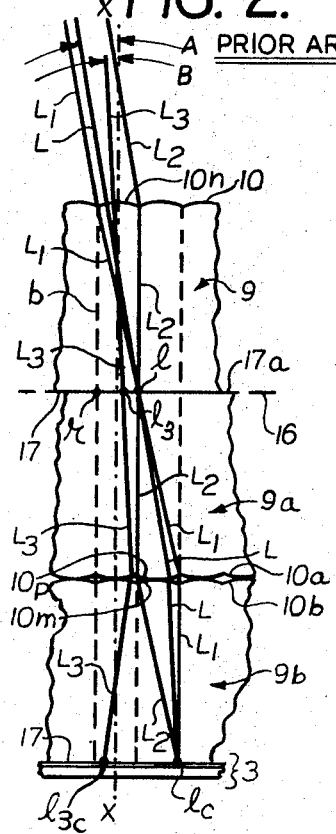
FIG. 2 is an enlarged, vertical, sectional view of a prior art construction.

FIGS. 3 through 16, both inclusive, are all enlarged vertical sectional views of various types of in-camera converters within the scope of this invention;

FIG. 17 is similar to FIG. 1, showing a conversion system according to this invention; and FIG. 18 is a schematic view of a photosensitive plate for use in the system of FIG. 17.

In the drawing, all the cylindrical lenses, or lenticulations, are shown greatly enlarged relative to other parts of the depicted systems in order to show their structure and function more clearly.

Although only cylindrical lenses are herein described, it will be clear to those skilled in the art that spherical lenses may also be used when it is desired to obtain multiaxial stereoscopic effects, i.e., both horizontal and vertical relief.

Referring now to the drawing and, particularly, to FIG. 1 thereof, one form of relief camera is shown. A three-dimensional object 2 is imaged by a lens 1 upon a transparent cylindrical lens plate 6 having lenticulations 7 which form one surface thereof. Each of the lenticulations 7 forms an image of the aperture of lens 1 which, for optical purposes, may be considered at infinity relative to the small lens elements 7. The other surface 8 of the plate 6 is placed closely adjacent to the emulsion 4 on a base 5 of any conventional photosensitive medium 3. A ray R from a point R' on the object 2 will be imaged upon the photosensitive medium 3 at a point $r$ while a ray L from a point L' is imagined at point $l$ on the photosensitive medium 3. Rays R and L represent a right eye $E_R$ and a left eye $E_L$ view of the object 2. The words RIGHT and LEFT apply to both the object and the overall image format focused upon the photosensitive medium 3 via the lenticulations 7. Photographic exposure is, of course, accomplished by means of a vertically-operating horizontal slot-type shutter (not shown) which operates close to a horizontal slot-type lens aperture (also not shown). The lens 1 in practice may be of conventional construction consisting of two elements, such as, for example, one on each side of the shutter and the aperture, both of which are well known in the art.

After exposure and processing of the photosensitive medium 3, there will be depicted thereon an exact, top side up, right–left three-dimensional image of the object 2 when a lens plate 6 or a similar conventional lens plate having substantially the same number of lenticulations per inch is placed closely adjacent to the base side 5 of the photosensitive medium 3; and when the film is properly oriented, the film may either be viewed as a transparency by back lighting, or by front lighting through lenticulations 7 if a print of the exposed photosensitive medium 3 is used.

The relief image seen will be quite impressively three-dimensional to observers using both eyes, but will be abnormal or pseudoscopic, as noted above, rather than normal or truly stereoscopic. This abnormal type of relief will be opposite to that observed in the real world in that a subject's face and eyes will appear to follow the viewer, rather than turn away, as the viewer moves his head to either side of the relief photograph. It has been observed that all human viewers will believe the relief photograph presents a normal relief effect if the head is not moved to either side or if the relief photograph is not turned about a vertical axis.

The above described abnormal condition will be seen to be due to the fact that while the overall right–left format observed by the viewer is correct, the format of individual data bits below each lenticulation is an exact reversal of that which is desired in order to present a true, rather than pseudoscopic, three-dimensional presentation. Put another way, while the overall effect of the total picture is correct and properly viewed, the viewer's eyes see reverse data through each individual lenticulation.

It is therefore obviously necessary to convert the data associated with each lenticulation while maintaining the overall data intact from the point of view of right to left.

Reversal and correction of the positioning of each strip of data under each lenticulation can be accomplished by processing of the exposed film. However, this invention is directed to means for effecting the data strip reversal, without reversing the overall data format, prior to formation of the image upon the photosensitive film.

The data strip reversal system shown in FIG. 2 is similar to that described in U.S. Pat. No. 3,301,154.

In this system identical lens plates 9, 9a and 9b are placed with their lens elements coaxial relative to elemental axis x–x. A first lens plate 9b is located with its flat surface 17 adjacent to the photosensitive medium 3 in the same manner as is similar plate 6 in FIG. 1. Its lentriculated surfaces 10b are in contact with surfaces 10a of a second lens plate 9a. while the flat surface 17a of the second lens plate 9a is in contact with a flat surface 17 of a third or top lens plate 9. The dotted lines in this and in other similar FIGS. indicate the confines of one lenticulation width on each plate assembly. A ray L, corresponding to ray L in FIG. 1, will be focused at point $l$ on the plane 16 between flat surfaces 17 and 17a by the top lens plate 9. Rays $L_1$ and $L_2$ indicate the edge limits of these ray bundles entering a lens element 10n. Due to the action of similar abutting lens elements 10m and 10p of the first and second lens plates 9b and 9a, the image point $l$ will be imaged at point $l_c$ on the photosensitive medium 3 at the edge of the next adjacent lens column. However, a ray $L_3$ which intersects axis $x-x$ at a smaller angle will be imaged at a point $l_{3c}$ within the lens column containing axis $x-x$.

When all rays corresponding to points between $r$ and $l$ are traced, it will be found that only those rays close to the axis $x-x$ will intercept the photosensitive medium 3 within the lens column about axis $x-x$. Rays farther from axis $x-x$ will be found to fall within the second adjacent lens column. However, the relief data will be reversed in order relative to that between $r$ and $l$, both in the column about axis $x-x$ and in the second adjacent column.

Although reversal of the relief data provided by the third lens plate 9 is accomplished by the first and second lens plates 9a and 9b, it will be clear that the relief data will be scattered into the second adjacent lens element column when the angle B is increased to about one-third the magnitude of the limiting ray angle A. This condition is analogous to "crosstalk" in a communications system. While this optical "crosstalk" does not prevent a corrected or normal relief-image from being obtained, the effect of this "crosstalk" is to cause a small lateral shift of picture detail as the viewer moves sideways while viewing the three-dimensional image. This has the overall effect of limiting the viewing angles over which an acceptable three-dimensional image can be seen to a fraction of that available in the system shown in FIG. 1. Since a large objective lens 1 is necessary to approximate even the base width of the average human eye separation, the above angular limitation reduces the useful base of lens 1 to be a corresponding fraction of the full width of lens 1. If a larger lens 1 is used to overcome this limitation, the size, weight and cost of the camera system must be increased. This is obviously disadvantageous.

Figure 3:
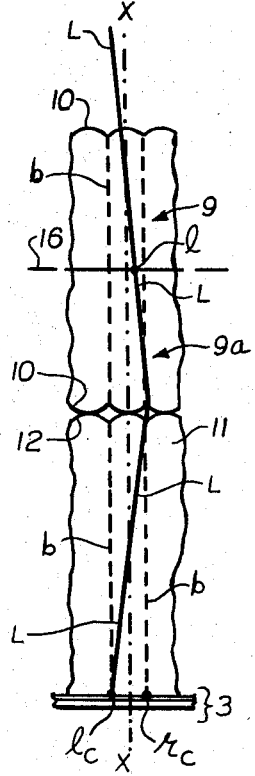
Figure 4:
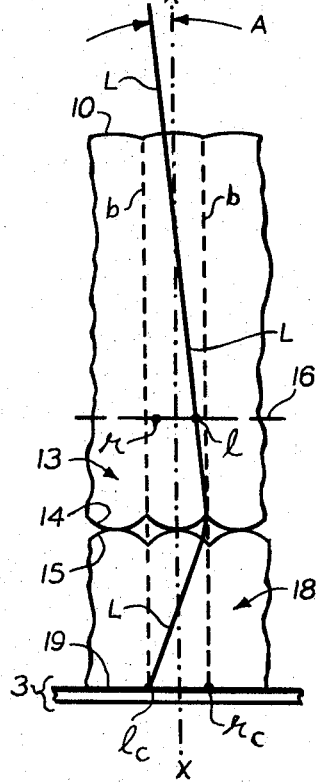

Referring now to FIG. 3, it will be seen that the above-cited limitation may be reduced or eliminated by employing a thick first lens plate 11 adjacent to the film 3 having lenticulations 12 of longer focal length than the second and third lens plates 9 and 9a. In this type of relief data converter, the corrected data between $l_c$ and $r_c$ will cover the full width of the vertical lens column between the dotted lines $b$. In this improved system, the second and third lens plates 9 and 9a may be identical, as in FIG. 2, or may have different lens radii and/or thicknesses. Suitably, the first lens plate 11 is thicker than either of the second and third lens plates, preferably about twice as long as either of them.

Where it is desired to reduce the thickness of the stack of three lens plates as shown in FIG. 3, the system shown in FIG. 4 may be employed to cojointly obtain corrected relief data on the photosensitive medium 3 over the full width of the lenses 10. In this type of converter, the lenses 14 and 15 cojointly act to refocus the relief data between the points $r$ and $l$ in the focal plane 16 at points $l_c$ and $r_c$ on the photosensitive medium 3. To accomplish this, the lens plates 13 and 18 are made thinner than the lens plate 9 and the lens plate 13 is made thinner than the lens plate 18. However, when the overall lens plate stack thickness need not be limited, the plates 13 and 18 may be of any desired thickness, provided that their thickness ratio is chosen to provide magnification of the line $rl$ to the width of line $l_c r_c$ equal to the spacing between dotted lines $b$. The radii of the lenses 14 and 15 must also be selected to image the line $rl$ upon the line $l_c r_c$ on the photosensitive medium 3. For example, the ratio of the radii of lens 14 to lens 15 will be substantially equal to the ratio of the thicknesses of lens plate 13 to lens plate 18.

Figure 5:
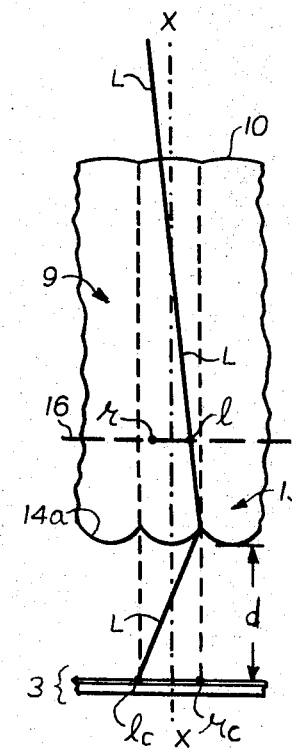

If it is desired to further simplify and improve the system, the lens plate 18 (of FIG. 4) may be eliminated, as shown in FIG. 5. Any conventional, independent external means (not shown) may be used to provide the spacing $d$ between the photosensitive medium 3 and the lens plate 13 to produce a magnified image of the line $rl$ on the line $l_c r_c$ on the photosensitive medium 3, similar to that shown in FIG. 4. However, the lens elements 14a on the lens plate 13 must have a curvature sufficient to cause the line $rl$ to be imaged upon the line $l_c r_c$. A further advantage of the system shown in FIG. 5 is that the photosensitive medium 3 does not make contact with the lens elements or lens plates, and therefore, possible wear upon both the film and the lenses and lens plates is avoided.

Figure 6:
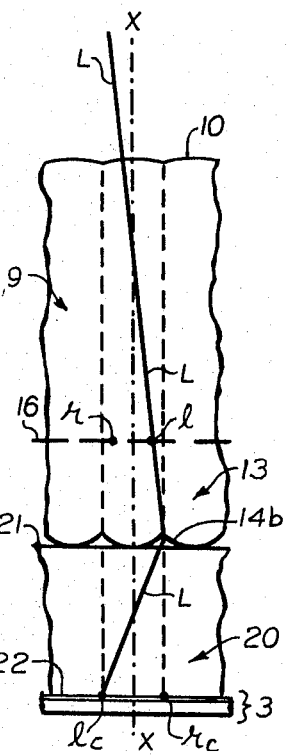

When it is desired to provide a positive rigid spacing between the photosensitive medium 3 and the lens plate 13, a flat glass or plastic plate 20 having plane surfaces 21 and 22 may be utilized, as shown in FIG. 6, to achieve such spacing. In this form of converter, lens elements 14b of lens plate 13 must have a curvature sufficient to cause line $rl$ to be imaged on line $l_c r_c$ at the proper length (that is, the width of elements 10).

In FIGS. 7, 8, 9, 10, 11, and 12 various converter systems are illustrated in which the spacing between lens elements 10 and focal plane 16, between focal plane 16 and elements 14c, 14d, 14e, 14f, 14g, or 14h and between elements 14c, 14d, 14e, 14f, 14g, or 14h and the film plane are approximately equal. In these systems the spacing between $r$ and $l$ and between $l_c$ and $r_c$ are substantially the same.

Figure 7:
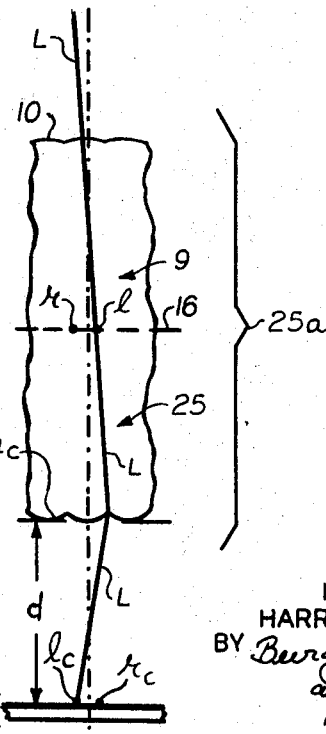

The systems shown in FIGS. 7 and 8 correspond to those shown in FIGS. 5 and 6, respectively, in that first lens plate (18 in FIG. 4) is eliminated. The system shown in FIG. 9 is similar to that shown in FIG. 8, except that the composite spacer and lentriculated film assembly 40 is used in place of the spacer plate 23 (similar to plate 20 in FIG. 6). The assembly 40 shown in FIG. 9 consists of a photosensitive emulsion 45 attached to the flat surface 46 of a lenticulated element 44, over which a transparent element 41 having a flat surface 42 is situated in intimate contact with the lens surfaces 43 of the element 44. The element 41 may be constructed of transparent material which may be dissolved when the emulsion 45 is processed after exposure, or a material which may be peeled away from the readout or picture viewing lenticulations 43 before or after processing of the emulsion 45, as described in my co-pending application, Ser. No. 649,309. One advantage of the assembly 40 is that it may, when desired, be sufficiently flexible to be in the form of a film roll.

As shown in FIGS. 10 and 12, frictional wear of elements 14e may be desirably eliminated by interposing a plate of glass, or other suitable durable transparent material, 26 between the lens plate 25 and the assembly 47 (as shown in FIG. 12). The assembly 47 is similar to assembly 40 of FIG. 9, but has a lenticulated surface 49 in place of the flat surface 42 in the assembly 40. The lenticulations 14h and 49 cojointly function to focus the line $rl$ as the line $l_c r_c$ on the emulsion 45.

FIGS. 10 and 11 show alternate applications of protective plate 26. In FIG. 10, the lenses 30 of the lenticulated film 29 serve both as components of the relief converter and as the lens system for viewing after processing. Since lens plates are usually constructed of plastic materials, they are more subject to wear than a harder material, such as glass. Therefore, the use of a protective plate 26 between photosensitive medium 3 and the first lens plate 32 as shown in FIG. 11 will allow conventional roll film to be used when desired.

All the types of relief converters described in connection with FIGS. 2—12, inclusive, may utilize spherical lenses in place of cylindrical lenses, as will be clear to those skilled in this art. The type of relief converter described below in connection with FIGS. 13 and 14 is primarily intended for use with a cylindrical lens plate. When used with circular lenses, the converter shown in FIGS. 13 and 14 will function only about one axis while the other axis remains unaffected. When using spherical lenses, the systems shown in FIGS. 2—12 will provide corrected relief images when the viewer's eyes are horizontally spaced or spaced along any other line relative to horizontal. However, the relief conversion system shown in FIGS. 13 and 14 will provide normal relief along only one axis while the relief along an axis perpendicular to the corrected axis will be unaffected or abnormal.

The relief data conversion system shown in FIG. 13 utilizes a multiplicity of lenses 61. Dove type prisms 63 are located beneath a lenticulated plate 60 to accomplish relief data conversion. The rays R and L are refracted by the lens elements 61 and the flat surface 62, are further refracted by the surface 64 of the prism 63, then reflected by the surface 66 of the prism 63, then refracted by the surface 65 of the prism 63, and finally impinge upon the photosensitive medium 3 at the points $l_c$ and $r_c$. The points $l_c$ and $r_c$ and all points between correspond to rays between R and L, but in reverse order from that which would occur if the prism 63 were not used. The curvature of the elements 61, the angles between the refractive surfaces 64 and 65 and the reflective surface 66, the refractive indices of the plate 60 and the prism 63, and the thicknesses $e$ and $f$ may readily be determined by those skilled in the optical art so that substantially parallel ray bundles incident upon the lens elements 61 are focused upon the photosensitive medium 3.

FIG. 14 shows one possible modification of FIG. 13 in which a protective plate 67, similar to the plate 26 shown in FIG. 10, is interposed between prisms 63 and a lenticulated film assembly 40 (similar to that shown in FIG. 9). Readout lenticulations 43 are optically transparent until the time the cover film 41 is removed, as previously described. Wear damage to the film 40 by the sharp edges 70 of the prisms 63 and wear on the prisms themselves is eliminated by the plate 67, which may be constructed of glass or any other suitable material. In some cases, it may be desired to apply a reflective coating to the surfaces 66 of the prisms 63 rather than to rely entirely upon internal reflection since internal reflection may be lost in the contact areas in the region of dimension $f$ due to the close contact between refractive surfaces.

Figure 15:
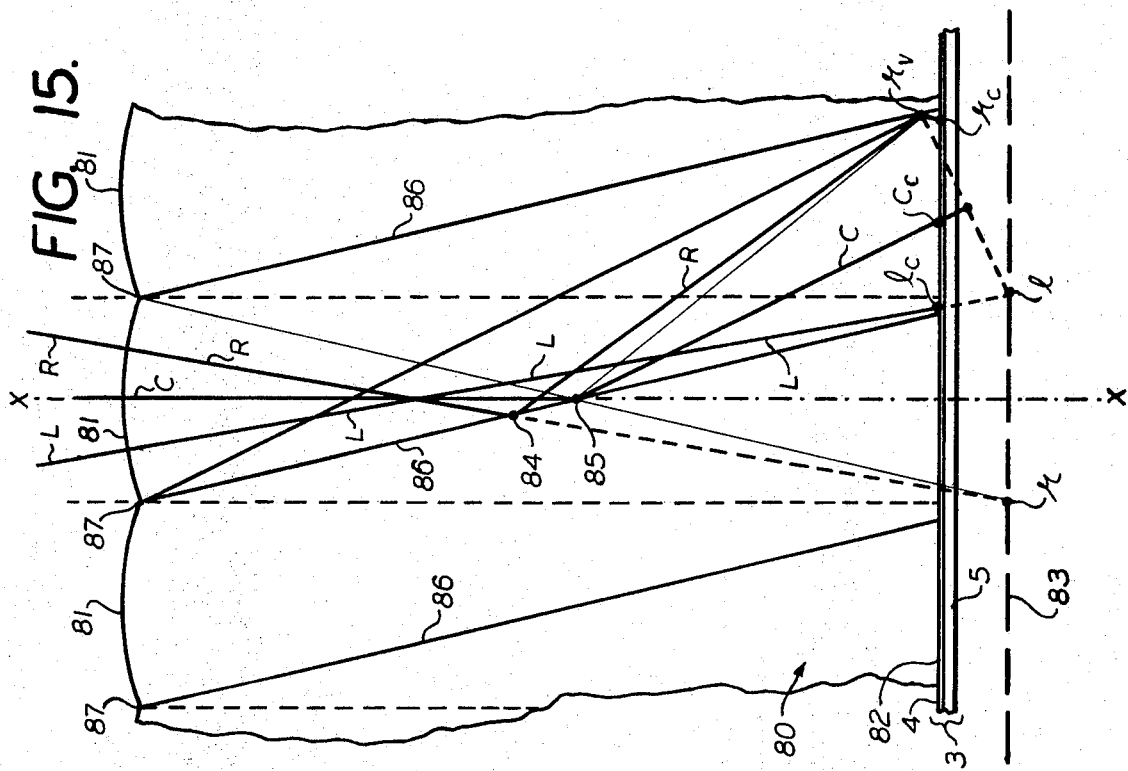

The relief data conversion system shown in FIG. 15 utilizes reflection in a manner similar to the system of FIGS. 13 and 14, but does not additionally rely upon refraction as in the case of the prisms. Since refraction is not used, the corrected relief data points $l_c$ and $r_c$ are shifted laterally from their corresponding positions in the systems of FIGS. 13 and 14. In the FIG. 15 system, the lenticulations 81 of the conversion lens plate 80 would, if plane mirror elements 86 were not present, focus right and left relief data at points $r$ and $l$ upon the plane 83 (in a manner similar to the lenses 7 of the conventional lens plate 6 in the system of FIG. 1). However, due to the action of the plane mirrors 86, which are parallel with and substantially coincident with the cusp lines 87 of the lenticulations 81, the rays L, C and R, fall at points $l$ and $r_c$. To achieve the best average focus of rays R and L in actual practice, it has been found desirable to make the plate 80 slightly thinner than an equivalent conventional plate so that the photosensitive medium 3 may be located above the plane 83 to achieve the best average focus of rays falling in the vicinity of the points $l_c$ and $r_c$. The ray R will be reflected at the point 84 on a mirror plane 86 while the ray C, which is coincident with lens axis x–x, will be reflected at the point 85 on the same plane mirror 86. In the simple construction shown in FIG. 15, the extreme ray L falls directly at point $l_c$ and does not require reflection. It will be clear to those skilled in this art that the lateral shift of the relief data to the extent of one or two lens widths is of no practical consequence since, in practice, there are hundreds of lenses across the format of a typical relief photograph.

Figure 16:
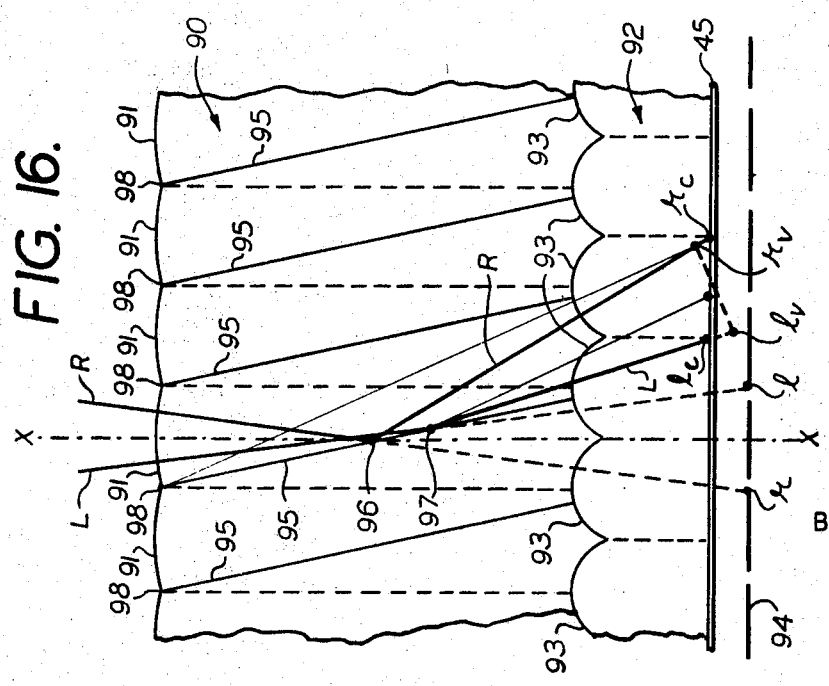

The relief data conversion system shown in FIG. 16 is very similar to the FIG. 15 system, but includes a removable lens element 92 containing a film emulsion 45, as in the FIG. 9, 10, 12 and 14 systems. The lens element 92 may be removed by peeling it from the lens element 90. The element 90 may alternately be dissolved away at the time the emulsion 45 is processed, or at another time. While the lens element 92 is attached to the lens element 90, it is in such intimate contact with the lens element 90 that the lens elements 93 are substantially transparent. However, after separation of the elements 90 and 92 and after the processing of emulsion 45, the lens elements 93 may be used to view the photograph as a normal relief image. Since the emulsion 45 and the element 92 are never separated, perfect registry of $l_c$ $r_c$ relief data relative to the lens elements 93 is assured. This desirable combination of lens elements 92 and a photosensitive emulsion 95 is possible when a desirable thin and usually desirable flexible readout lens element 92 is combined with a lens element 90 having lens elements 91 of longer focal length and containing plane mirror elements 95—the planes of which are parallel with the lens elements and which conicide with the cusp lines 98 between lens elements 91. In a manner similar to the function of the FIG. 15 system, the unconverted relief data points $r$ and $l$ virtually focused on plane 94 are reflected to further virtual points $l_r$ and $r_r$. However, placement of the photosensitive emulsion 45 slightly above the plane 94 permits corrected relief data $l_c$ and $r_c$ to be recorded photographically.

In FIG. 17, a relief data converter utilizing concave cylindrical or spherical lenses 107 is shown. The image of an object 102 is focused upon a lens plate 106 having concave or negative type cylindrical or spherical lenses 107 by a lens 101 in the same manner as shown in FIG. 1 with respect to focusing upon the lenses 7 by the lens 1. Since negative lenses 107 directly place the points $r$ and $l$ in the correct order relative to the right and left sides of the overall format, the elements of a normal relief image exist at the virtual focal plane 110 of the negative lenses 107. It will be appreciated that it is impossible to place photosensitive film in the position of a virtual image. It is therefore necessary to project this virtual image plane 110 upon the film 112 by means of a projection lens 103. The corrected data points between $r$ and $l$ will then be imaged between points $r_c$ and $l_c$ on the film 112 in the proper order relative to the overall format, even though the overall format is reinverted by the lens 103. To insure that the full image field is recorded on the film emulsion 104, an auxiliary lens 111 is placed close to the lens plate 106 which lens 111 effectively focuses an image of the lens 101 upon the lens 103. It will be clear to those skilled in the optical art that the lens 101 will preferably consist of front and rear elements spaced on opposite sides of the stop plane and that the lens 111 may consist of separate elements on either side of the lens plate 106. When the photosensitive medium 103 is processed and viewed in the usual manner through a conventional cylindrical lens plate having substantially the same number of lenses per inch as the number of relief data elements per inch of width equal to the distance between points $r_c l_c$, the image will appear in normal relief. Since the assembly designated as 100 comprises a negative lens plate 106, an auxiliary lens 111, a projection lens 103 and photosensitive medium 112, all of which may be fixed in position relative to each other, the assembly 100 may be considered a relief data converter. The overall image of the object 102 may be focused by moving this assembly 100 relative to the lens 101 in the housing 109, or vice versa, just as the overall image of the object 2 may be focused by relative movement between the lens $l$ and the assembly 9d in the FIG. 1 camera system.

Since the FIG. 17 system provides an erect image, a lenticulated film 120, as shown in FIG. 18, may be substituted for conventional photosensitive medium 103 when desired. This lenticulated film may carry any conventional emulsion 122 upon its unlenticulated base 121 since this emulsion does not have to be exposed from within the lenticulated base 121, as contrasted to the FIG. 10 system which requires an emulsion designed for exposure from within the lenticulated base 29. The lenticulations 123 may be designed with the most optimum radii of curvature for subsequent viewing from the lenticulated side as a normal relief photograph. The space frequency of the lenticulations 123 must, of course, match the space frequency of the $r_c l_c$ data groups.

It will be appreciated that it is within the spirit and scope of this invention to provide the lenticulated assembly shown in FIGS. 3, 4, 6, 8, 9, 10, 11 and 12 in either film form as part of the photosensitive recording medium or in plate form as part of the permanent camera assembly.

In the first situation, where the cylindrical lenticulated assembly is in film form, it should be understood that the film assembly must be at least as flexible as the photosensitive recording medium so as to be capable of composite assembly therewith, as well as winding onto and unwinding off of a spool without deregistry of the various lenticulated surfaces. In this regard, it may be advisable to provide the lenticulations lengthwise (that is, parallel to the long dimension of the film) so as to avoid or minimize deregistry and misalignment of the several lenticulations. In this regard, however, care should be taken that the photograph is always taken with the lenticulations having a vertical axis, both when the photographic image is placed on the photosensitive recording means and when viewing such.

In the second situation set forth above, where the cylindrical lenticulated assembly is in plate form, care should be taken that the various lenticulated members of the assembly maintain registry with respect to each other and with respect to the recording media. This can be accomplished by rigid construction and synchronized sprocket coupling with the media.

Under some circumstances, a mixed lenticulated plate assembly-lenticulated film assembly is utilized (see particularly FIGS. 9, 10, 12 and 14). Under these conditions, great care must be taken to insure registry of the various lenticulations.

The following points will be clear to those skilled in this art:

1. Two-axis normal relief images may be achieved when spherical lenses are employed in the system of FIGS. 2, 3, 4, 5, 6, 7, 8, 9, 10, 11, 12, 17 and 18 in lieu of cylindrical lenses. While spherical lenses may be used in the system of FIGS. 13, 14, 15 and 16 in lieu of cylindrical lenses, the second or horizontal axis for vertical pseudostereoscopic images will not be converted to normal stereoscopic images.

2. In the systems of FIGS. 1, 2, 3, 4, 10 and 12, the first lens plate adjacent to the photosensitive medium 3 may actually carry a photosensitive emulsion on its flat surface and thereby make the use of a separate conventional photosensitive sheet or plate unnecessary. Such a photosensitive emulsion must, however, be designed for exposure from within the lens plate, rather than for external exposure as in conventional photographic film.

3. While all systems shown will function without an auxiliary collimating lens placed directly over the top lens plate in the path of rays L and R and other similar rays from the objective lens 1, their operations may be improved or modified, when desired, by the addition of such a lens to these systems. Such a lens, not shown, would collimate all rays from the stop plane of lens 1, as shown and described in copending application, Ser. No. 649,308. As also shown and described in the copending application, Ser. No. 649,308, a second adjustable auxiliary lens situated between this first auxiliary lens and lens 1 may be added to accomodate substantial changes in the focal distance between lens 1 and the top lenticulated plate upon which the relief image is effectively focused.

4. It will be clear that the precise position of the focal plane selected for lens 1, as related to the position of the subject for which best focus is desired, should coincide with the plane in which the center of curvature 7C of lens elements 7 lie, as indicated in FIG. 1, or in a corresponding position relative to the top lens plates of the systems shown in FIGS. 2, 3, 4, 5, 6, 7, 8, 9, 10, 11, 12, 15 and 16. However, since the total thickness of the usual lens plate or composite lens plate assembly is small as compared with the focal length of lens 1 or its equivalent, lens 1 may, in practice, be focused upon the actual lenticulations of the top lens plate.

5. In the conversion system shown in FIG. 17, the negative lenses 107 may be a composite lens system situated on both sides of a transparent plate 106, or on the side of plate 106 facing the lens 101 when desired. The auxiliary lens 111 may similarly be placed on either side of negatively lenticulated plate 106. Further, the auxiliary lens 111 may be divided into two or more elements placed on either or both sides of the plate 106, when desired, as will be apparent to those skilled in the optical art. In the FIG. 17 system, the negative lens plate 106 may be replaced by a doubly positively-lenticulated plate 25a, such as shown in FIG. 7. The projection lens 103 will then focus the corrected or converted real relief image outside the lens plate 25a upon photosensitive recording means 112 as shown. Use of the projection lens 103 offers the advantage that the relief image focused on photosensitive recording means 112 may, when desired, be enlarged or reduced in size by appropriate adjustments in the positions of the lens 103 and the photosensitive medium 112 relative to the lens plate 106 or the lens plate 25a.

6. It will be clear that the second and third lens plates in the FIGS. 2, 3, 4, 5, 6, 7, 8, 9, 10, 11 and 12 systems may consist of a single plate having the required lenticulations on both faces thereof.

Composite films are generally known materials. Such films are available where all sub films thereof are made of the same material and are held together by adhesives or static electricity forces or blocking effects. It is further known to produce composite films whose components are of different composition and therefore have differing melting points, solubilities in various solvent materials and other physical properties.

The production of composite films having desirable parting, adhesion and/or solubility properties for use in this invention is not per se within the purview of this invention. Rather, use is made herein of such known films having specifically identified properties and/or shapes. However, as illustrative of two sub films having differing solubility properties, there can be mentioned polyvinyl alcohol, which is substantially water-soluble, and polyethylene, which is substantially water-insoluble. Film-forming materials which can readily be molded into the desired shape for use herein include polyvinyl chloride, polypropylene, polystyrene, styrene-acrylonitrile copolymers, acrylic acid and methacrylic acid ester homo and copolymers, polyvinyl acetate, vinylidene chloride polymers, etc.

Appropriately lenticulated, counterlenticulated, negatively lenticulated and multiple-face lenticulated films and sub films can be conveniently made by conventional plastics-forming processing techniques, such as solvent casting, melt extrusion, solvent extrusion, etc., as appropriate to the particular material being used.

Appropriately formed plates for use in permanent camera installation can be made from glass, quartz and/or various optically useable plastics, such as polymethyl methacrylate.

I claim:

1. A camera apparatus for taking stereoscopic pictures comprising a major lens having an aperture, a photosensitive recording medium remote from said major lens and at least two lenticulated means disposed between said major lens and said photosensitive recording medium; wherein the aperture width of each lenticulation is substantially the same, wherein the optical axes of adjacent lenticulations are substantially parallel, and wherein corresponding lenticulations of adjacent lenticulation means have identical optical axes; wherein the lenticulation means closest to said major lens is the primary lenticulation and has lenticulations which form inverted images of said major lens aperture on the side thereof away from said major lens and smaller than the aperture width of each of such lenticulations; and wherein the lenticulation means disposed between said closest lenticulation means and said photosensitive recording means is the secondary lenticulation means and has lenticulations which are projecting lens means which form images of said inverted images on said photosensitive medium which images are erect with respect to said major lens aperture, are each of a width substantially equal to the aperture width of said lenticulations, and are each wider than their corresponding inverted images.

2. An apparatus as claimed in claim 1, wherein said secondary lenticulation means is composed of two sets of substantially parallel lenticulations of opposite curvatures, each pair of lenticulations forming a projecting lens means.

3. An apparatus as claimed in claim 1, having three lenticulated plates substantially parallelly disposed to each other.

4. The improved apparatus as claimed in claim 3, wherein the plate adjacent said recording means is about twice as thick as either of said other plates.

5. The improved apparatus as claimed in claim 3, wherein the plate adjacent said recording means is about as thick as the cumulative thickness of said other plates.

6. An apparatus as claimed in claim 1, including an auxiliary collimating lens disposed between said major lens and said lenticulation means.

7. An apparatus as claimed in claim 1, wherein said lenticulation means is a single transparent plate having parallel lenticulations on opposite major surfaces thereof.

8. An apparatus as claimed in claim 1, wherein said lenticulation means is a first transparent plate having parallel and opposite lenticulations on opposite major surfaces thereof and a second transparent plate disposed between said first plate and said recording means having lenticulations on the surface thereof facing said major lens, wherein lenticulations facing the major lens have convex curvature, and lenticulations facing said recording means have concave curvature with respect to said major lens.

9. The improved apparatus as claimed in claim 1, further including a substantially transparent plate disposed between said lenticulation means and said recording means.

10. The improved apparatus as claimed in claim 1, wherein said recording means has on the surface thereof directed toward said lenticulation means a substantially transparent film of a thickness substantially equivalent to the distance between said recording means and said plate assembly.

11. The improved apparatus as claimed in claim 10, wherein said transparent film is a composite film composed of a lenticulated subfilm disposed adjacent said recording means and a counterlenticulated film matched to said lenticulated film disposed adjacent said lenticulated plate assembly.

12. The improved apparatus as claimed in claim 11, wherein said counterlenticulated subfilm is removable from said film assembly.

13. The improved apparatus as claimed in claim 11, wherein said counterlenticulated subfilm is soluble in a material which is substantially inert with respect to said lenticulated film and to said recording means.

14. The improved apparatus as claimed in claim 13, wherein said counterlenticulated film is polyvinyl alcohol.

15. The improved apparatus as claimed in claim 1, wherein said lenticulation means are a composite film composed of a first lenticulated subfilm adjacent said recording means and a second subfilm containing counterlenticulations adjacent said first subfilm and lenticulations directed toward said apertured major lens.

16. The improved apparatus as claimed in claim 1, wherein said lenticulations are cylindrical.

17. In a camera apparatus for taking stereoscopic pictures comprising a major lens having an aperture, a photosensitive recording means remote from said apertured lens, and a lenticulated plate assembly therebetween; the improvement which comprises providing a dove prism between each lenticulation and said recording means.

18. The improved apparatus as claimed in claim 17, wherein all of said prisms are substantially identical.

19. The improved apparatus as claimed in claim 17, wherein the major base of said prism has a reflective coating thereon.

20. The improved apparatus as claimed in claim 19, further including a substantially transparent means between said prism and said recording means.

21. A camera apparatus for taking stereoscopic pictures comprising a major lens having an aperture, a photosensitive recording medium remote from said major lens and lenticulation means disposed therebetween, wherein there are reflective surfaces extending from the meeting point of adjacent lenticulations on said lenticulation means extending diagonally through said lenticulation means to the focal planes of said lenticulations.